Patented Sept. 2, 1941

2,254,382

UNITED STATES PATENT OFFICE 2,254,382

POLYMERIZABLE MONO-ESTERS OF MALEIC ACID AND POLYMERS DERIVED THEREFROM

Harry T. Neher, Bristol, Pa., assignor to Röhm & Haas Company, Philadelphia, Pa.

No Drawing. Application October 3, 1938, Serial No. 233,023

8 Claims. (Cl. 260—78)

This invention relates to new polymerizable esters of maleic acid, particularly to the mono esters of maleic acid and unsaturated alcohols having the general formula—

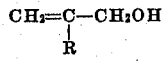

in which R is a lower alkyl group such as methyl, ethyl, propyl, butyl, etc.

It relates further to polymers made from these esters and to joint polymers of these esters with other polymerizable materials.

The esters with which this invention is concerned have the general formula—

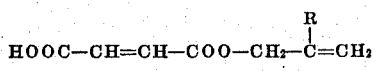

and may be prepared by any convenient method. These esters on standing at room temperature for several days gradually change to a rubbery, colorless, transparent polymer.

It is known that some esters of maleic acid, notably the dialkyl esters, can be polymerized to a certain extent by heating them with organic peroxides. Even under the most favorable conditions, however, the yield of polymer is small and, if pure polymer is desired, it is necessary to separate it from the remaining monomer by distillation. The polymers thus obtained are usually semi-liquid masses or brittle solids. They are soluble in most common organic solvents and have a relatively low molecular weight. The polymerization takes place very slowly and even in the presence of catalysts it is necessary to heat for a relatively long time in order to produce appreciable amounts of polymer.

The mono esters of maleic acid having the general formula given above behave quite differently. They polymerize very readily, especially in the presence of catalysts, to yield polymers which are practically insoluble in the common organic solvents, infusible and of a relatively high molecular weight. The polymers may be hard and brittle or somewhat soft, depending on the group represented by R in the general formula. When R is a methyl group, the polymers obtained are harder than those obtained when it is ethyl or higher alkyl groups. In keeping with common usage, the radical

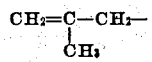

is hereafter called "methallyl." Thus

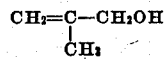

becomes methallyl alcohol rather than isopropenyl carbinol.

It was quite unexpected to find that esters of this type would polymerize so readily and form products which are insoluble and infusible. The other maleic acid esters such as the dialkyl esters, can be polymerized only with difficulty as was pointed out above. Methallyl alcohol does not polymerize at all. It therefore could not have been predicted that methallyl acid maleate would polymerize very readily. In fact, if the amount of catalyst and the heating are not carefully controlled, the methallyl acid maleate may polymerize with almost explosive violence.

The mono esters of the unsaturated alcohol and maleic acid can be polymerized alone, in conjunction with other polymerizable organic compounds to form joint polymers of widely varying properties, in solution or in aqueous emulsion. When polymerized in solution, the polymer of the mono ester precipitates as it is formed. If another polymerizable material is also present, a gel is usually formed from which the solvent can be easily removed, leaving a clear polymer, the hardness and other properties of which depend on the relative amounts of the two constituents as well as on the nature of the second constituent of the joint polymer. Most of the joint polymers, even those containing as little as 20% of the mono ester of maleic acid, are insoluble in the common organic solvents and practically infusible.

The mono esters of maleic acid of the general formula given above may be prepared by any convenient method. A very simple method is to gently heat a mixture of the alcohol, for example, methallyl alcohol, with an equimolecular amount of maleic anhydride. Generally speaking, it is best not to heat the mixture much above 50° C. during the formation of the ester, particularly if it is desired to obtain the ester in the monomeric form. In the case of methallyl alcohol and maleic anhydride the reaction is complete in less than an hour at 40-45° C. and practically no polymerization takes place under these conditions. The monomeric esters are colorless, somewhat viscous liquids. They are soluble in the common organic solvents such as benzene, ethylene dichloride, alcohol, acetone, ethyl acetate and other similar esters, chloroform, etc. and are insoluble in water.

The invention may be illustrated by the following examples but it is not limited to the exact time, temperature, and other operating conditions since it may otherwise be practiced within the scope of the appended claims. The parts are by weight.

*Example 1.*—50 parts of maleic anhydride and 36 parts of methallyl alcohol are mixed and stirred at 40° C. for about one hour. During this time the anhydride dissolves in and reacts completely with the alcohol yielding a colorless, somewhat viscous liquid, which cannot be distilled without decomposition. On standing for several weeks at 20–25° C. this liquid gradually thickens and changes to a colorless, transparent mass which on longer standing ultimately becomes quite hard and somewhat brittle. The polymer is practically infusible and insoluble in the common organic solvents.

*Example 2.*—Methallyl acid maleate containing 0.1% of benzoyl peroxide is heated on a steam bath. At 90° C. a vigorous bubbling starts and the temperature rises rapidly. After a few minutes the reaction subsides and the mass is allowed to cool to room temperature. The resulting product is a colorless, transparent, slightly tacky solid.

*Example 3.*—One part of methallyl acid maleate containing 0.1% of benzoyl peroxide is dissolved in 4 parts of ethylene dichloride. The solution is heated to boiling and within a few minutes the polymer begins to precipitate as a white powder. The polymerization is complete in about half an hour.

*Example 4.*—A mixture of 50 parts of methyl acrylate, 25 parts of maleic anhydride and 18 parts of methallyl alcohol is heated to 40–45° C. for one hour. To 54 parts of the resulting clear solution 46 parts of methyl acrylate, 0.1 part of benzoyl peroxide and 150 parts of ethylene dichloride are added. The solution thus obtained is refluxed on a water bath. In about 15 minutes after refluxing has started the entire mass sets to a clear, rubbery gel from which the joint polymer of methyl acrylate and the methallyl acid maleate can be obtained by evaporating the solvent. The resulting joint polymer is a colorless, transparent solid which is swollen but not dissolved by the common organic solvents.

*Example 5.*—A mixture of 100 parts of benzene, 25 parts of methallyl acid maleate, 75 parts of styrene and 0.1 part of benzoyl peroxide is heated under a reflux to 90–95° C. After two hours the mixture sets to a soft, slightly turbid gel. The joint polymer, after removal of the solvent, is a transparent, colorless, hard, tough solid insoluble in benzene, acetone, ethylene dichloride and alcohol. It shows little tendency to swell in these solvents.

*Example 6.*—A mixture of 100 parts of ethylene dichloride, 25 parts of methallyl acid maleate, 50 parts of methyl acrylate, 25 parts of ethyl methacrylate and 0.1 part of benzoyl peroxide is heated as in Example 5. After three hours the mixture sets to a stiff, colorless, transparent gel from which the solid joint polymer can be obtained by evaporating the ethylene dichloride. The final product is hard, tough and transparent, which is swollen but not dissolved by common organic solvents.

*Example 7.*—500 parts of 1% aqueous solution of ammonium polyacrylate is heated to 80° C. and a mixture of 100 parts of methyl methacrylate, 25 parts of methallyl acid maleate and 1.0 part of benzoyl peroxide is added to the vigorously agitated solution over a period of about one hour. The heating and agitation are continued for another hour and a half after which time there is no odor of methyl methacrylate. The resulting aqueous suspension of the joint polymer of methyl methacrylate and methallyl acid maleate is cooled, filtered and the residue washed with water. The polymer thus obtained is in the form of a moderately fine, white powder. It is insoluble in acetone and ethyl acetate but swells without dissolving in benzene and ethylene dichloride. The solid molds readily under the influence of heat and pressure to give relatively insoluble, clear molded objects.

In place of the methallyl acid maleate used in the foregoing example other esters, such as ethallyl acid maleate, propallyl acid maleate and higher homologs may be used. In general the polymers obtained from these esters are softer than those obtained from the methallyl acid maleate.

Other polymerizable materials besides those mentioned in the examples may be employed in making the joint polymers. These include esters and other functional derivatives of acrylic and methacrylic acid, such as the chlorides, nitriles, amides, anhydrides, etc., vinyl esters and ethers, etc.

The polymers of the mono esters of maleic acid described above, whether of a single ester, a mixture of esters or a joint polymer with another polymerizable material, all contain free carboxyl groups. They thus have the character of polybasic acids and can be converted into salts, esters, etc. Thus, the polymers may be used in the preparation of polyhydric alcohol-polybasic acid condensation products either alone or in conjunction with other polybasic acids or with monobasic acids. Because of the rapidity with which these esters polymerize they are especially useful in cases where it is desirable to effect polymerization in situ. Materials such as paper, wood, fabrics, may be thoroughly impregnated with polymer by saturating them with the monomer in which has been dissolved a small amount of a catalyst such as benzoyl peroxide, then subjecting them to a short heat treatment. Because of the free carboxylic groups in the polymers it is possible to modify their properties by treating the polymers with basic substances or with salts.

During the heating of the mono esters of maleic acid for the purpose of polymerizing them, it is possible that some of the maleate is converted to fumarate. The corresponding monomeric mono esters of fumaric acid will behave in the same manner as the maleates described above when subjected to polymerizing conditions. These esters of fumaric acid have the same general formula as those of maleic acid and this formula as used in the claims is intended to represent both maleates and fumarates.

I claim:

1. As a new composition of matter an ester having the general formula—

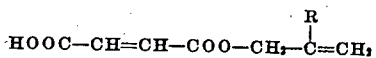

in which R is a lower alkyl group containing not more than four carbon atoms.

2. Methallyl acid maleate.

3. As a new composition of matter a polymeric material containing in polymeric form an ester having the general formula—

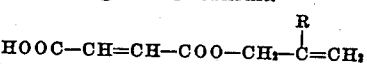

in which R is a lower alkyl group containing not more than four carbon atoms.

4. Polymeric methallyl acid maleate.

5. A joint polymer of an ester having the general formula—

$$HOOC-CH=CH-COO-CH_2-\underset{\underset{R}{|}}{C}=CH_2$$

in which R is a lower alkyl group containing not more than four carbon atoms and at least one other polymerizable material selected from the group consisting of other mono esters having the foregoing formula, vinyl esters, vinyl ethers, styrene and the esters, chlorides, nitriles, amides, and anhydrides of acrylic and methacrylic acids.

6. A joint polymer of methallyl acid maleate and a lower alkyl ester of methacrylic acid.

7. A joint polymer of methallyl acid maleate and methyl methacrylate.

8. A joint polymer of methallyl acid maleate and a lower alkyl ester of acrylic acid.

HARRY T. NEHER.